United States Patent
Givens et al.

(10) Patent No.: US 11,901,711 B1
(45) Date of Patent: Feb. 13, 2024

(54) TYPE H COMPACT ELECTRIC TRANSMISSION LINE SUPPORT STRUCTURE

(71) Applicant: INVENTUS HOLDINGS, LLC, Juno Beach, FL (US)

(72) Inventors: Phillip S. Givens, Palm City, FL (US); Chung Jerry Wong, West Palm Beach, FL (US); Robert K. Dunn, Juno Beach, FL (US); Jerry W. Hutcheson, Bunnell, FL (US); Jose R. F. Ribeiro, Miami, FL (US); Keith E. Lindsey, La Canada, CA (US); Miguel A. Flores, Rosemead, CA (US); Thomas R. Koegel, Orland Park, IL (US); Erica Souza Nogueira Bretas, Andover, MA (US)

(73) Assignee: Inventus Holdings, LLC, Juno Beach, FL (US)

( * ) Notice: Subject to any disclaimer, the term of this patent is extended or adjusted under 35 U.S.C. 154(b) by 584 days.

(21) Appl. No.: 17/147,374

(22) Filed: Jan. 12, 2021

Related U.S. Application Data

(63) Continuation-in-part of application No. 29/746,184, filed on Aug. 12, 2020, now Pat. No. Des. 993,927.

(Continued)

(51) Int. Cl.
  *H02G 7/20* (2006.01)
  *H02G 1/04* (2006.01)
  *H02G 1/02* (2006.01)

(52) U.S. Cl.
  CPC ........... *H02G 1/04* (2013.01); *H02G 1/02* (2013.01); *H02G 7/20* (2013.01); *H02G 7/205* (2013.01)

(58) Field of Classification Search
  CPC ............ H02G 7/20; H02G 1/04; H02G 7/205
  (Continued)

(56) References Cited

U.S. PATENT DOCUMENTS

| | | |
|---|---|---|
| 3,002,043 A | 9/1961 | Jenner |
| 3,316,342 A | 4/1967 | Cofer |

(Continued)

FOREIGN PATENT DOCUMENTS

| | | |
|---|---|---|
| CN | 206053502 | 3/2017 |
| CN | 206673533 | 11/2017 |

(Continued)

OTHER PUBLICATIONS

What is difference between a feeder and transmission line? Doshi Gorakh Answered Aug. 14, 2016.

(Continued)

*Primary Examiner* — Mahdi H Nejad
(74) *Attorney, Agent, or Firm* — Fleit Intellectual Property Law; Jeffrey N. Giunta

(57) ABSTRACT

An electric transmission line support structure. A crossarm depending perpendicularly from a vertical shaft has a first and a second mounting point. A central support depends from the crossarm between the first and the second mounting point. A first conductor bundle is attached to the first mounting point by a first structural string and to the central support by a second structural string. A second conductor bundle is connected to the central support by a third structural string and to the second mounting point by a fourth structural string. A fifth structural string, perpendicular to the crossarm and extending between the first conductor bundle and the second conductor bundle, connects the central mounting point to a third conductor bundle that is further from the crossarm than the first conductor bundle and the (Continued)

second conductor bundle. A sixth structural string connects the vertical shaft to the third conductor bundle.

10 Claims, 3 Drawing Sheets

Related U.S. Application Data

(60) Provisional application No. 63/063,079, filed on Aug. 7, 2020.

(58) Field of Classification Search
USPC .................................. D13/110; D25/127
See application file for complete search history.

(56) References Cited

U.S. PATENT DOCUMENTS

| | | | |
|---|---|---|---|
| 4,219,742 | A | 8/1980 | Ponder |
| 4,458,102 | A | 7/1984 | White |
| 4,521,198 | A | 6/1985 | Lindsey |
| D387,881 | S | 12/1997 | Tallon |
| 8,952,251 | B2 | 2/2015 | Fulk et al. |
| 9,698,585 | B2 | 7/2017 | Ma et al. |
| 9,768,601 | B2 | 9/2017 | Fulk et al. |
| 10,218,162 | B2 | 2/2019 | Talabathula et al. |
| D853,596 | S | 7/2019 | Pauley et al. |
| D853,598 | S | 7/2019 | Fulk et al. |
| D853,599 | S | 7/2019 | Fulk et al. |
| D853,600 | S | 7/2019 | Pauley et al. |
| 11,482,848 | B2 * | 10/2022 | Urs ........................ H01B 17/02 |
| 11,551,835 | B2 * | 1/2023 | Lindsey ................. H01B 17/40 |
| D993,927 | S * | 8/2023 | Lindsey ...................... D13/110 |
| 11,799,278 | B1 * | 10/2023 | Givens ..................... H02G 7/05 |
| 2014/0052393 | A1 | 2/2014 | Tang et al. |

FOREIGN PATENT DOCUMENTS

| | | |
|---|---|---|
| CN | 107869271 | 4/2018 |
| CN | 108574246 | 9/2018 |
| CN | 208251779 | 12/2018 |
| EP | 1128513 | 8/2001 |
| EP | 2501007 | 9/2014 |
| EP | 2501006 | 12/2015 |
| EP | 2501005 | 4/2017 |
| FR | 2498386 | 7/1982 |
| GB | 344132 | 3/1931 |
| GB | 2566670 | 3/2019 |
| WO | WO9426013 | 11/1994 |

OTHER PUBLICATIONS

Transmission Line Design Power Substation / Transmission and Distribution HV Transmission Line Components (Towers, Conductors, Substations, ROWs and Roads) SearchEEP—Electrical Engineering Portal by Edvard, Jan. 8, 2018.
Power Transmission Towers, Hydro-Quebec—Understanding Electricity, Mar. 4, 2020.

* cited by examiner

TYPE H COMPACT ELECTRIC TRANSMISSION LINE SUPPORT STRUCTURE

FIELD OF THE DISCLOSURE

The present disclosure generally relates to support structures for high voltage electric power lines, and more particularly to physically compact support structures that have reduced requirements for height or right of way width.

BACKGROUND

Electric power utilities distribute electric power to customers that are able to be located at various locations within a large geographical area. The electric power that is provided to customers is able to originate at generation facilities that are located remotely from many of the customers of that electric power. In general, electric transmission lines are used to convey the electric power from the generation facilities to electric distribution facilities located near the customers who are to use the electric power.

Electric transmission lines generally convey three-phase power at high voltages. The three-phase power is conveyed via one or more circuits, where each circuit generally consists of three conductor bundles, which are typically suspended above the ground by electric transmission line support structures. The support structures for electric transmission lines are designed to maintain a minimum separation between each of the three conductor bundles and other conductive surfaces such as other support structure components or the ground in order to reduce the occurrences of flashover from those conductors to conductors of different potentials or conductive surfaces of the support structure.

Electric transmission line support structures support the conductors at a specified height about the ground. Suspended electric transmission lines are also placed within a Right-Of-Way (ROW) that has a specified width in a direction perpendicular to the direction of the conductors to ensure a minimum distance between the conductors and other structures or vegetation in order to ensure the safe and reliable operation of the electric transmission line, and minimize the magnitude of electric and magnetic fields at the edge of the Right-Of-Way.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
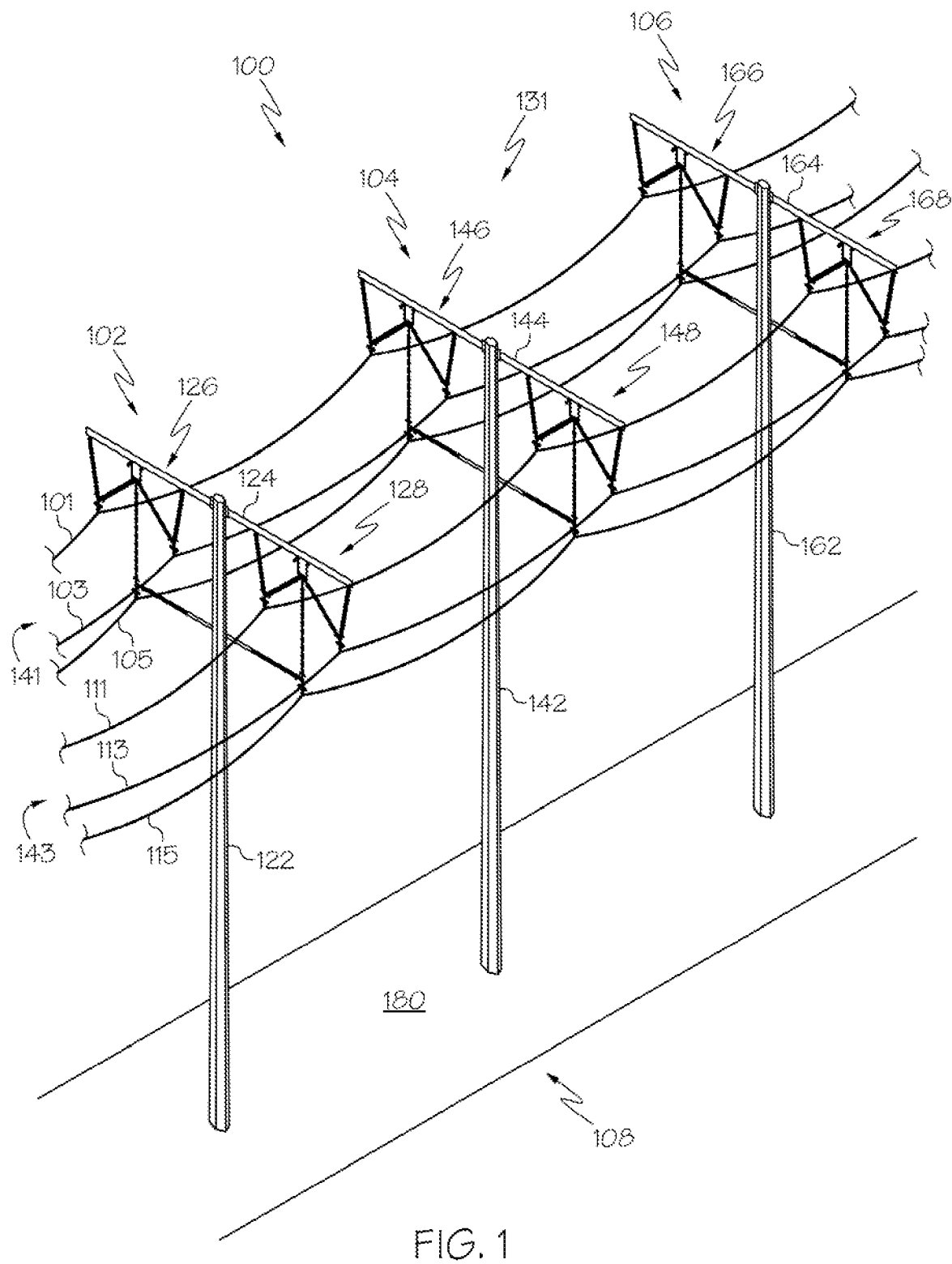
FIG. 1 depicts a portion of an electric transmission line supported by compact electric transmission line support structures, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Several characteristics are desirable for electric transmission line support structures that are to be used in newly installed or expanded electric power transmission line systems. It is desirable to have electric transmission line support structures that reduce visual impact, land impact, electric and magnetic fields at the edge of right of way, and that improve the power flow through a given right of way which allows improved acceptance of the electric transmission line system, improves its operation and reduces costs. The below described electric transmission line support structures support the use of compact double circuit 345 Kilovolt (kV) structure(s) that provide effective physical support of the conductors carrying electrical current for each phase of each three-phase AC circuit. Effective support of the conductors of each phase provided by the below described electric transmission line support addresses the following aspects of electric power transmission line operations:

1. Control of corona and field effects caused by increased voltage gradient along the transmission line, which can result in corona induced audible noise and radio interference;
2. Increased reliability by providing adequate phase spacing and phase position to avoid outages due to galloping, and the below described electric transmission line support structures address isolation coordination issues such as live line minimum approach distance, switching surge and lightning impulse voltages, contamination, and avian interaction;
3. The below described electric transmission line support structures further provide effective support for the conductors of the transmission line by providing sufficient mechanical strength and movement of structural strings and hardware assemblies under various weather and load cases.

The below described electric transmission line support structures include characteristics that improve their public acceptance by reducing the visual impact of the transmission line. In some situations, the siting of transmission lines is subject to subjective criteria that are used as a basis for approval of a transmission line route and of the line design and reduced visual impact is desired. The visual impact of an electric power transmission line system is sometimes judged based on the number of transmission line support structures per mile, the structure and transmission line height above ground, and overall footprint of the electric power transmission line system. By reducing the distance between phases in the below described electric transmission line support structures, the height and width of the compact transmission structures are reduced when compared to conventional structures, thus resulting in a reduction in visual impact due to narrower rights of way. The reduced right of way requirements for the below described electric transmission line support structures for electric transmission also advantageously reduces the costs associated with clearing vegetation within the right of way.

The below described electric transmission line support structures provide advantages with regards to land impact and improving power flow. Improving the utilization of existing rights of way and reducing the width of the right of way that is required for the construction and/or installation of a new electric transmission line provides many advantages. The below described electric transmission line support structures allow increasing the amount of electric power that can flow through an existing right of way with a width that is sized for a conventional single circuit 115 kV or 138 kV transmission line while providing the possibility to reduce visual impact via fewer structures per mile and structure heights or widths less than those required for conventional single circuit 345 kV lines. Compared to a conventional single circuit 138 kV line, a double circuit compact 345 kV line can provide more than 20 times the electric power throughput in the same right of way.

The design of the below described electric transmission line support structures advantageously control Electric and Magnetic (EM) fields in the vicinity of the electric transmission lines they support. In some environments, regulations may limit EM field strengths at the edges of right of way of the electric transmission line. In some examples, a wider right of way is used for a particular electric transmission line in order to satisfy such EM field strength limits. The phase compaction and optimal phase arrangement exhibited by the below described electric transmission line support structures reduces EM field strength levels and thus reduces the required width of rights of way to satisfy EM field strength limits. This reduction in EM field strength levels also reduces impacts on adjacent conductive elements like gas pipelines.

The above characteristics of the below described electric transmission line support structures allows the realization of transmission line solutions to power network power flow problems that are more feasible and effective because they require less right of way, provide greater power flow capability than conventional options, reduce visual impacts and land impacts, and limit EM field strengths while providing reliable performance.

Described below are compact electric transmission line support structures that advantageously allow for reductions in structure height, Right-Of-Way (ROW) width, or combinations of these. In general, electric transmission line support structures are desired to have reduced physical height above the ground to reduce the visual impact of the electric transmission line facilities. These electric transmission line support structures are also desired to have reduced requirements for the width of their Right-Of-Way (ROW) in order to minimize the amount of real estate that is required to be dedicated to the electric transmission line, within which land use activities are limited to those which do not affect the safe operation of the electric transmission line.

In order to achieve the reduced height and width requirements for the Right-Of-Way (ROW) for an electric transmission line, the below described compact electric transmission line support structures are designed to support electric transmission lines that include one or more three-phase electric circuits. In these examples, each three-phase electric circuit includes three bundles of conductors, or conductor bundles, with each conductor bundle carrying a different phase of the three-phase electric power. In the below examples, the three conductor bundles in each circuit are supported in a compact delta arrangement. These compact electric transmission line support structures support these three conductor bundles in each circuit with a particular arrangement of structural strings that are attached to the support structure at particular locations as is described in detail below. In some examples, the compact electric transmission line support structures are able to support one or two circuits that each carry three-phase electrical power in order to increase the electric current carrying capacity of the electric transmission line being supported.

In some examples, the structural strings that connect the conductor bundles to the tower support structure are made of non-conductive porcelain or glass hardware that are connected in a string. In some further examples, the structural strings are able to be composite post non-conducting hardware that are constructed of composite materials consisting of, in some examples, combinations of one or more of fiberglass, rubber, or polymer material. In the following discussion, conductor bundles are described as being connected to the tower support structure by "structural strings." In the following discussion, the term "structural strings" is able to refer to either suspension structures or post structures. Suspension structures are for example able to support forces primarily in tension. Although such structural strings are able to support a generally small amount of force in compression, such structural strings are generally considered tension only structural strings. Post structural strings in general can support forces in both tension and compression.

The below described compact electric transmission line support structures support circuits that each have three conductor bundles to carry high voltage, three phase electric power usually over long distances. The support structures for these electric transmission lines are designed to maintain a minimum separation distance between the conductor bundles that carry the current of different phases of the three-phase electrical power. This minimum separation distance among the conductor bundles carrying three different phases is maintained to avoid flashover between phases. The structure of the below described compact electric transmission line support structures advantageously maintain a minimum separation among each of the three conductor bundles that is less than the inter-phase separation of conventional electric transmission line support structures by utilizing a particular arrangement of structural strings to connect the conductors to the support structure.

The design of the below described compact electric transmission line support structures advantageously provides reduced spacing between the conductor bundles carrying the different phases. This reduced spacing between circuits provides a narrow profile that reduces the requirements for the width of the right of way for the electric transmission lines and reduces EM field levels and effects. The below described compact electric transmission line support structures also support the conductor bundle carrying the bottom phase of each circuit independently from the conductor bundles carrying top two phases of those circuits. The arrangements and spacings achieved with the designs of the below described compact electric transmission line support structures further advantageously reduce losses, provides lower impedance, and allows greater utilization of narrow rights of ways for power transmission due to multiple high-capacity circuits. The structure of the below described compact electric transmission line support structures also allows for live line maintenance through provision of adequate work space and adequate minimum approach distance.

The conductors used to carry electric current for each phase are able to be configured as just one conductor for each phase, or bundles of multiple conductors can be arranged in parallel in close physical proximity as conductor bundles to carry the electric current of a particular electrical phase. Such conductor bundles with multiple conductors reduce the impedance and voltage gradient of that electrical phase. In the following discussion, "conductor bundles" is to be understood to include not only bundles of multiple conductors, but "conductor bundles" are also able to describe examples that use only one conductor to carry the electric current of each electrical phase.

The use of conductor bundles with multiple conductors for each phase reduces the voltage gradient of the electrical phases. These bundles of multiple conductors increase the effective conductor radius of each phase to mitigate increases in voltage gradient for each circuit that are caused by reduced distances between the phases of each circuit in the designs of the below described compact electric transmission line support structures and thus reduces the effects of the increased voltage gradient such as corona discharges.

The disclosure herein relates to elements of the design and construction of a transmission line project and corresponding structures. Any hardware implementation, arrangement, or development (including hardware designs, specifications, methods, techniques, procedures, inventions, ideas, as-yet-developed ideas, improvements, enhancements and/or processes) may be used to realize and/or reduce to practice the structures described herein, including assembly and maintenance methods, foundations, conductors, insulators, structural strings, plates, flanges, vangs, grips, posts, clamps, pivot members, chains, universal joints, attachment points, shafts, lattice structures, crossarms, towers, guy wires, mounting locations, and related components while remaining within the spirit and scope of the disclosure.

FIG. 1 depicts a portion of a transmission line supported by compact electric transmission line support structures 100, according to an example. The illustrated portion of a transmission line supported by compact electric transmission line support structures 100 depicts three (3) compact electric transmission line support structures, a first structure 102, a second structure 104, and a third structure 106.

The first structure 102 includes a first tower vertical shaft 122 and a first crossarm 124. The second structure 104 includes a second tower vertical shaft 142 and a second crossarm 144. The third structure 106 includes a third tower vertical shaft 162 and a third crossarm 164.

The portion of a transmission line supported by compact electric transmission line support structures 100 depicts a right of way 180. The compact electric transmission line support structures are located within the right of way 180 in order to ensure the safe and reliable operation of the transmission line and minimize the magnitude of electric and magnetic EM fields at the edge of the ROW 108.

Each of these three (3) compact electric transmission line support structures support two (2) three-phase power line circuits 131 that includes a first circuit 141 and a second circuit 143. The first circuit 141 includes a first circuit first phase conductor bundle 101, a first circuit second phase conductor bundle 103, and a first circuit third conductor bundle 105. The second circuit 143 includes a second circuit first phase conductor bundle 111, a second circuit second phase conductor bundle 113, and a second circuit third conductor bundle 115.

The first structure 102 includes a first tower first set of structural strings 126 to support the first circuit 141 and a first tower second set of structural strings 128 to support the second circuit 143. The second structure 104 includes a second structure first set of structural strings 146 to support the first circuit 141 and a second structure second set of structural strings 148 to support the second circuit 143. The third structure 106 includes a third tower first set of structural strings 166 to support the first circuit 141 and a third tower second set of structural strings 168 to support the second circuit 143. The configuration of these sets of structural strings is described in further detail below.

Each circuit in the illustrated three-phase power line circuits 131 includes three conductor bundles that are arranged in a delta configuration, which is an arrangement where the three conductor bundles form a triangle with internal angles in the range of 30 to 120 degrees. In various examples, each conductor bundle is able to contain a single conductor or multiple conductors that are supported by a connection mechanism at each compact transmission line support structure. The structure of the compact electric transmission line support structures, the connection of the conductor bundles to those towers via a particular arrangement of structural strings, and other aspects are described in further detail below.

Figure 2:
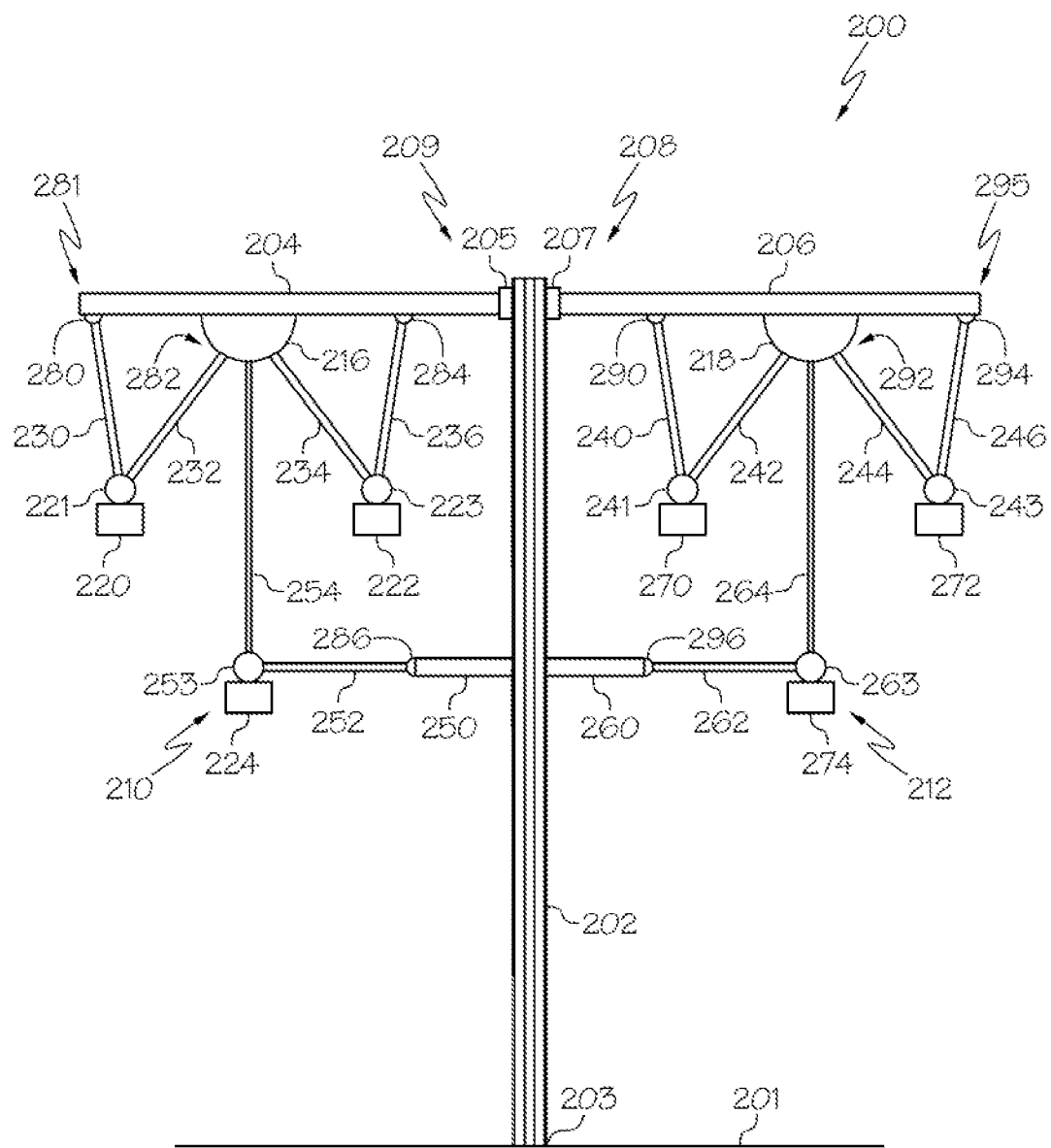
FIG. 2 illustrates a compact electric transmission line support structure configuration, according to an example.

FIG. 2 illustrates a compact electric transmission line support structure configuration 200, according to an example. The compact electric transmission line support structure configuration 200 has a tower structure that includes a vertical shaft 202 and a full crossarm 209 that in the illustrated example consists of a first crossarm 204 and a second crossarm 206. The vertical shaft 202 is mounted on the ground 201 at a mounting location 203 and supports one or more three-phase electric transmission line circuits above the ground 201 as is discussed below. In some examples, the vertical shaft 202 is either able to be directly buried into the ground 201 or installed on top of foundations that are formed at the mounting location 203 in the ground 201. In some alternative examples, guy wires or other supplemental supporting structures may be used in conjunction with the vertical shaft 202 and full crossarm 209.

The full crossarm 209, which consists of the first crossarm 204 and the second crossarm 206 in the illustrated example, is attached to a top end 208 of the vertical shaft 202. The first crossarm 204 is attached to a first vertical side of the top end 208 of the vertical shaft 202 at a first crossarm shaft attachment point 205. The second crossarm 206 is attached to a second vertical side of the top end 208 of the vertical shaft 202 at a second crossarm shaft attachment point 207, where the second vertical side of the top end 208 is opposite the first vertical side of the top end 208. The first crossarm 204 and the second crossarm 206 are able to be attached to the vertical shaft 202 by any suitable technique such as by bolted flanges, bolted vangs, other attachments, or combinations of these.

The first crossarm shaft attachment point 205 and the second crossarm shaft attachment point 207 are able to be located near or at the top end 208 of the vertical shaft 202, including locations on the vertical shaft 202 that are near but removed from, or that are at the very end of, the vertical shaft 202 that is opposite the ground 201. In some examples, crossarm members are able to be attached to the vertical shaft 202 at any suitable location.

In alternative examples, a full crossarm 209 is able to consist of a single shaft, such as a single shaft that attaches to the top end 208. In yet further examples, the crossarm is able to be constructed as any structure. In an example, at least one of the vertical shaft 202, the first crossarm 204, and the second crossarm 206 are able to be constructed of shafts with circular cross-sections or with polygonal cross-sections. Such a shaft in an example is able to consist of a hollow tubular structure with a smooth outer surface, a hollow tube formed by multiple flat sides, such as a tube formed with a twelve (12) sided polygonal cross-section, a solid or hollow shaft of any cross-section and surface characteristic, or combinations of these. In further examples, one or more of the vertical shaft 202 and full crossarm 209 of the compact electric transmission line support structure configuration 200 are able to be constructed as a lattice structure, or according to any suitable design.

A first central mounting support 216 perpendicularly protrudes from the first crossarm 204 towards the ground 201. In the illustrated example, the distal end of the first central mounting support 216 has a first central mounting point 282, where the distal end is an end of the first central mounting support 216 that is opposite of the connection of the first central mounting support 216 to the first crossarm 204. In further examples, the first central mounting point 282 is able to be located at any location of a first central mounting support 216 that is below the first crossarm 204.

A second central mounting support 218 perpendicularly protrudes from the second crossarm 206 towards the ground 201 and similarly has a second central mounting point 292 at its distal end. In further examples, the second central mounting point 292 is able to be located at any location of a second central mounting support 218 that is below the second crossarm 206. In further alternative examples, the first crossarm 204 and the second crossarm 206 are able to have respective central mounting supports that are attached in any manner with any hardware and arranged in any configuration relative to other components of the compact electric transmission line support structure configuration 200.

The vertical shaft 202 has a first horizontal support 250 depending from a vertical portion of the vertical shaft 202 and extending parallel to and under the first crossarm 204 and a second horizontal support 260 extending parallel to and under the second crossarm 206. As described in further detail below, the first horizontal support 250 and the second horizontal support 260 connect to structural strings to support a respective conductor bundle of each circuit.

The illustrated compact electric transmission line support structure configuration 200 supports two circuits, a first circuit 210 and a second circuit 212. Each circuit includes three conductor bundles that carry three-phase high voltage power where each conductor bundle carries electric current for a different phase of the three-phase electric power. In further examples, a compact electric transmission line support structure similar to that described below is able to support only one circuit, such as only the first circuit 210.

In one example, each conductor bundle in the illustrated circuits is able to include two conductors. In that example, each circuit has three bundles of two conductors each. Further examples are able to have any number of conductors for each electrical phase, which are referred to herein as a conductor bundle. In various examples a "conductor bundle" is able to include only one conductor or any number of conductors. In the example where each conductor bundle includes three conductors, each circuit has three conductor bundles that are separated by a minimum phase separation distance, and each of those conductor bundles has three conductors.

The first circuit 210 includes a first circuit first conductor bundle 220, a first circuit second conductor bundle 222, and a first circuit third conductor bundle 224. As discussed above each of these conductor bundles is able to include only one conductor, or any number of conductors. In an example, each conductor bundle includes three (3) conductors. In the illustrated example, the first circuit first conductor bundle 220 is attached to a first circuit first conductor bundle attachment point 221, the first circuit second conductor bundle 222 is attached to a first circuit second conductor bundle attachment point 223, and the first circuit third conductor bundle 224 is attached to a first circuit third conductor bundle attachment point 253.

In the illustrated example, the first circuit first conductor bundle attachment point 221 is connected to a first crossarm attachment point 280 on the first crossarm 204 by a first structural string 230. As discussed above, the first crossarm attachment point 280 in the illustrated example is at a first distal end 281 of the first crossarm 204, which is an end of the first crossarm 204 that is opposite the first crossarm shaft attachment point 205. In further examples, the first crossarm attachment point 280 is able to be located at any point along the first crossarm 204 that is farther from the first crossarm shaft attachment point 205 than the first central mounting support 216 and other attachment points to which other structural strings connecting conductor bundles of the first circuit 210 are attached. The first circuit first conductor bundle attachment point 221 is also connected to the first central mounting point 282 by a second structural string 232.

The first circuit second conductor bundle attachment point 223 is connected to a first near crossarm point 284 on the first crossarm 204 by a fourth structural string 236. The first near crossarm point 284 in the illustrated example is a second mounting point that is located between the first central mounting support 216 and the first crossarm shaft attachment point 205. The first circuit second conductor bundle attachment point 223 is also connected to a first central mounting point 282 at a distal end of the first central mounting support 216 by a third structural string 234. In an example, the distance between the first crossarm attachment point 280 and the first central mounting point 282 is substantially equal to the distance between the first near crossarm point 284 and the first central mounting point 282. In an example, the first central mounting point 282 is located at a point that is lower, i.e., closer to the ground 201, relative to the first crossarm 204 than the first near crossarm point 284 and the first crossarm attachment point 280.

The first structural string 230, the second structural string 232 form a first "V-string" that connect the first circuit first conductor bundle attachment point 221 either directly or indirectly to the first crossarm 204. The third structural string 234 and the fourth structural string 236 form a second "V-string" that connect the first circuit second conductor bundle attachment point 223 either directly or indirectly to the first crossarm 204. In an example, the first structural string attaches to the first mounting point with a first universal joint, the second structural string attaches to the central mounting support with a second universal joint, the third structural string attaches to the central mounting support with a third universal joint, and the fourth structural string attaches to the second mounting point with a fourth universal joint, where these universal joints allow rotation about their respective attachment point in any direction. In examples with such universal joints, the "V-strings" are able to swing in a manner that reduces forces on the full crossarm 209 and the vertical shaft 202. In an example, the first structural string 230, the second structural string 232, the third structural string 234, and the fourth structural string 236 comprise a post structural string and support forces in both tension and compression. In an example, the structural strings used in the v-string incorporate composite post structural strings. In some examples, each structural string is able to be constructed of a pair of parallel structural strings, or any number of structural strings in parallel, to increase strength.

The first circuit third conductor bundle attachment point 253 is connected by a fifth structural string 254 to the first central mounting point 282. The fifth structural string 254 is oriented perpendicularly relative to the full crossarm 209 and extends between the first circuit first conductor bundle attachment point 221 and the first circuit second conductor bundle attachment point 223. The first circuit third conductor bundle attachment point 253 is further from the full crossarm 209 than the first circuit first conductor bundle attachment point 221 and the first circuit second conductor bundle attachment point 223. The first circuit third conductor bundle attachment point 253 is also connected by a sixth structural string 252 to the first vertical shaft connection point 286 that is on a distal end of the first horizontal support 250 in the illustrated example. The distal end of the first horizontal support 250 is the end that is opposite the attachment point of the first horizontal support 250 to the vertical shaft. In further examples, the first circuit third conductor bundle attachment point 253 is able to be connected to the vertical shaft 202 by any suitable technique, such as a structural string extending to the vertical shaft 202, connecting to any support structure attached to the vertical shaft 202, connecting to any support structure, or combinations of these. In an example, the fifth structural string 254 is implemented as a suspension structural string that supports forces primarily in tension and the sixth structural string 252 is implemented as a "post structural string" that supports forces in both compression and tension.

The second circuit 212 includes a second circuit first conductor bundle 270, a second circuit second conductor bundle 272, and a second circuit third conductor bundle 274. As discussed above each of these conductor bundles is able to include only one conductor, or any number of conductors. In an example, each conductor bundle includes three (3) conductors. In the illustrated example, the second circuit first conductor bundle 270 is attached to a second circuit first conductor bundle attachment point 241, the second circuit second conductor bundle 272 is attached to a second circuit second conductor bundle attachment point 243, and the second circuit third conductor bundle 274 is attached to a second circuit third conductor bundle attachment point 263. The conductor bundles of the second circuit 212 are connected to points on the second crossarm 206 and the vertical shaft 202 in a manner similar to the connections of conductor bundles of the first circuit 210 to the first crossarm 204 and the vertical shaft 202.

In the illustrated example, the second circuit second conductor bundle attachment point 243 is connected to a second crossarm attachment point 294 on the second crossarm 206 by a tenth structural string 246. As discussed above, the second crossarm attachment point 294 in the illustrated example is at a second distal end 295 of the second crossarm 206, which is an end of the second crossarm 206 that is opposite the second crossarm shaft attachment point 207. In further examples, the second crossarm attachment point 294 is able to be located at any point along the second crossarm 206 that is farther from the second crossarm shaft attachment point 207 than the second central mounting support 218 and other structural string attachment points to which other structural string connecting conductor bundles of the second circuit 212 are attached. The second circuit second conductor bundle attachment point 243 is also connected to the second central mounting point 292 by a ninth structural string 244.

The second circuit first conductor bundle attachment point 241 is connected to a second near crossarm point 290 on the second crossarm 206 by a seventh structural string 240. The second near crossarm point 290 in the illustrated example is a second crossarm second mounting point that is located between the second central mounting support 218 and the second crossarm shaft attachment point 207. The second circuit first conductor bundle attachment point 241 is also connected to a second central mounting point 292 at a distal end of the second central mounting support 218 by an eighth structural string 242. In an example, the distance between the second crossarm attachment point 294 and the second central mounting point 292 is substantially equal to the distance between the second near crossarm point 290 and the second central mounting point 292. In an example, the second central mounting point 292 is located at a point that is lower, i.e., closer to the ground 201, relative to the second crossarm 206 than the second near crossarm point 290 and the second crossarm attachment point 294.

The seventh structural string 240, the eighth structural string 242 form a third "V-string" that connect the second circuit first conductor bundle attachment point 241 either directly or indirectly to the second crossarm 206. The ninth structural string 244 and the tenth structural string 246 form a fourth "V-string" that connect the second circuit second conductor bundle attachment point 243 either directly or indirectly to the second crossarm 206. In an example, the seventh structural string 240, the eighth structural string 242, the ninth structural string 244, and the tenth structural string 246 support forces in both tension and compression. In an example, the structural strings used in the v-string incorporate composite post structural strings. In some examples, each structural string is able to be constructed of a pair of parallel structural strings, or any number of structural strings in parallel, to increase strength.

The second circuit third conductor bundle attachment point 263 is connected to the second central mounting point 292 by an eleventh structural string 264. The second circuit third conductor bundle attachment point 263 is also connected by a twelfth structural string 262 to the second vertical shaft connection point 296 that is on a distal end of the second horizontal support 260 in the illustrated example. The distal end of the second horizontal support 260 is the end that is opposite the attachment point of the second horizontal support 260 to the vertical shaft. In further examples, the second circuit third conductor bundle attachment point 263 is able to be connected to the vertical shaft 202 by any suitable technique, such as an structural string extending to the vertical shaft 202, connecting to any support structure attached to the vertical shaft 202, connecting to any support structure, or combinations of these. In an example, the eleventh structural string 264 is implemented as a suspension structural string that supports forces primarily in tension and the twelfth structural string 262 is implemented as a "post structural string" that supports forces in both compression and tension.

In an example, both of the first circuit 210 and the second circuit 212 are each configured to carry electric power at a transmission voltage of three hundred and forty-five Kilovolts (345 kV). In one such an example, the compact electric transmission line support structure configuration 200 is designed to have a separation of approximately sixteen feet (16 feet) between the first circuit first conductor bundle 220 and the first circuit third conductor bundle attachment point 253 and also between the first circuit second conductor bundle 222 and the first circuit third conductor bundle attachment point 253. The compact electric transmission line support structure configuration 200 further maintains a separation between the first circuit first conductor bundle 220 and the first circuit second conductor bundle 222 of about eighteen feet (18 feet). Structural strings comprising the "V-strings" are each about ten feet, eight inches (10 feet, 8 inches). In this example, the first circuit second conductor bundle 222 is separated from the vertical shaft 202 by about nine and one half (9.5) feet. The first central mounting support 216 in an example has a length of about three and one third feet (3 and ⅓ feet) and thus the first central mounting point 282 is that distance below the first crossarm 204. In an example, the first crossarm attachment point 280 and the first near crossarm point 284 are separated from the first central mounting support 216 by about eleven (11 feet). In an example, the first horizontal support 250 is about six and one half feet (6.5 Feet). In some examples, the vertical shaft 202 is able to have an approximate height of between seventy and one hundred and thirty five feet (70-135 feet). The dimensions associated with elements of the second circuit 212 are similar to those described above.

The above dimensions are an example of a compact electric transmission line support structure configuration 200. In general, dimensions of the compact electric transmission line support structure configuration 200 are able to be adjusted, according to techniques known by practitioners of ordinary skill in the relevant arts in light of the present discussion, to accommodate transmitting electric power at any desired voltage.

Figure 3:
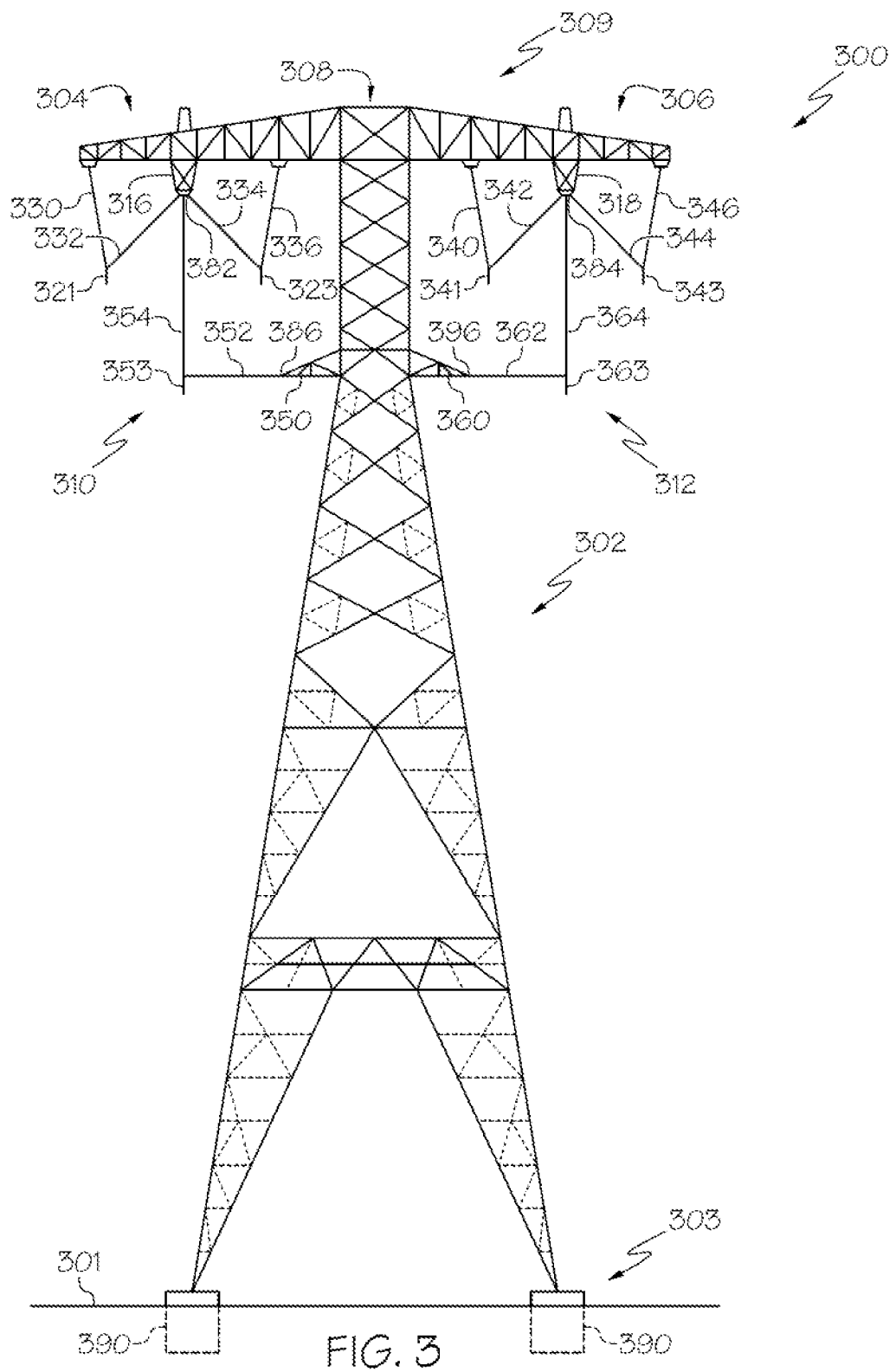
FIG. 3 illustrates an alternative compact electric transmission line support structure configuration, according to an example.

FIG. 3 illustrates an alternative compact electric transmission line support tower configuration 300, according to an example. The alternative compact electric transmission line support tower configuration 300 has a tower structure that is similar to the compact electric transmission line support structure configuration 200 but where the tower is constructed as a lattice structure. The arrangement of the structural strings and conductor bundles in the alternative compact electric transmission line support tower configuration 300 is similar to the configuration of those elements in the above described compact electric transmission line support structure configuration 200.

The alternative compact electric transmission line support tower configuration 300 has a tower structure that includes a vertical tower 302 and a full crossarm structure 309 that in the illustrated example consists of a first crossarm structure 304 and a second crossarm structure 306. The vertical tower 302 and the full crossarm structure 309 in this example are similar to the vertical shaft 202 and the full crossarm 209 described above but are constructed as a lattice structure. The vertical tower 302 is mounted on the ground 301 at a mounting location 303 and supports one or more three-phase electric transmission line circuits above the ground 301 as is discussed below. In an example, the vertical tower 302 is installed on top of foundations 390 that are formed at the mounting location 303 in the ground 301. In some alternative examples, guy wires or other supplemental supporting structures may be used in conjunction with the vertical tower 302 and full crossarm structure 309.

The full crossarm structure 309, which consists of the first crossarm structure 304 and the second crossarm structure 306 in the illustrated example, is attached to a top end 308 of the vertical tower 302 with a configuration similar to that discussed above with regards to the attachment of the first crossarm 204 and the second crossarm 206 to the vertical shaft 202. The full crossarm structure 309 in various examples is able to be attached at any suitable position of the vertical tower 302.

In a manner similar to the above described first central mounting support 216 and second central mounting support 218, a first central mounting structure 316 and a second central mounting structure 318 perpendicularly protrude from the first crossarm structure 304 and the second crossarm structure 306 towards the ground 301. As is also similar to the above described first central mounting support 216 and second central mounting support 218, distal ends of the first central mounting structure 316 and the second central mounting structure 318 have a first alternative central mounting point 382 and a second alternative central mounting point 384, respectively. In further examples, the first alternative central mounting point 382 and the second alternative central mounting point 384 are able to be located at any respective location of a first central mounting structure 316 or the second central mounting structure 318, respectively, that is below the full crossarm structure 309.

In a manner similar to the above described first horizontal support 250 and the second horizontal support 260, the vertical tower 302 has a first horizontal support structure 350 and a second horizontal support structure 360 that extend from opposite vertical sides of the vertical tower 302 so as to be parallel to and under the full crossarm structure 309.

In a manner similar to that described above with regards to the compact electric transmission line support structure configuration 200, the illustrated alternative compact electric transmission line support tower configuration 300 includes cable bundle attachment points to support cable bundles for two circuits. The illustrated alternative compact electric transmission line support tower configuration 300 shows cable bundle attachment points for two circuits, cable bundle attachment points for a first alternative circuit 310 and for a second alternative circuit 312, which are similar to the corresponding cable bundle attachment points discussed above for the compact electric transmission line support structure configuration 200. In further examples, an alternative compact electric transmission line support tower similar to that described below is able to include cable bundle attachment points that support only one circuit, such as only the first alternative circuit 310.

The conductor bundles of the alternative compact electric transmission line support tower configuration 300 are connected to points on the vertical tower 302 and the full crossarm structure 309 by arrangements of structural strings that are similar to those discussed above with regards to the compact electric transmission line support structure configuration 200. In the illustrated example, the first alternative circuit first conductor bundle attachment point 321 is connected to points on or near the first crossarm structure 304 by a first "V-string" of structural strings that includes the first alternative structural string 330 and the second alternative structural string 332. The first alternative circuit second conductor bundle attachment point 323 is connected to points on or near the first crossarm structure 304 by a second "V-string" of structural strings that includes the third alternative structural string 334 and the fourth alternative structural string 336. As shown, the second alternative structural string 332 and the third alternative structural string 334 are attached to the first alternative central mounting point 382, which is at a distal end of the first central mounting structure 316. As is described above with regards to the compact electric transmission line support structure configuration 200, these "V-strings" of structural strings each support forces in both tension and compression. In an example, the structural strings used in the v-string incorporate composite post structural strings. In some examples, each structural string is able to be constructed of a pair of parallel structural strings, or any number of structural strings in parallel, to increase strength.

In a manner similar to that described above for the first circuit third conductor bundle attachment point 253, the first alternative circuit third conductor bundle attachment point 353 is connected by a fifth alternative structural string 354 to the first alternative central mounting point 382 and by a sixth alternative structural string 352 to the first alternative vertical shaft connection point 386 that is on a distal end of the first horizontal support structure 350 in the illustrated example. In an example, the fifth alternative structural string 354 is implemented as a suspension structural string that supports forces primarily in tension and the sixth alternative structural string 352 is implemented as a post structural string that supports forces in both compression and tension.

The conductor bundles of the second alternative circuit 312 are connected to points on the second crossarm structure 306 and the vertical tower 302 in a manner similar to the above described connections of conductor bundles of the second circuit 212 to the second crossarm 206 and the vertical shaft 202. In the illustrated example, the second alternative circuit first conductor bundle attachment point 341 is connected to points on or near the second crossarm structure 306 by a first "V-string" of structural strings that includes a seventh alternative structural string 340 and an eighth alternative structural string 342. The second alternative circuit second conductor bundle attachment point 343 is connected to points on or near the second crossarm structure 306 by a second "V-string" of structural strings that includes a ninth alternative structural string 344 and a tenth alternative structural string 346. As shown, the eighth alternative structural string 342 and the ninth alternative structural string 344 are attached to the second alternative central mounting point 384, which is at a distal end of the second central mounting structure 318. As is described above with regards to the compact electric transmission line support structure configuration 200, these "V-strings" of structural strings each support forces in both tension and compression. In an example, the structural strings used in the v-string incorporate composite post structural strings. In some examples, each structural string is able to be constructed of a pair of parallel structural strings, or any number of structural strings in parallel, to increase strength.

In a manner similar to that described above for the second circuit third conductor bundle attachment point 263, the second alternative circuit third conductor bundle attachment point 363 is connected by a eleventh alternative structural string 364 to the second alternative central mounting point 384 and by a twelfth alternative structural string 362 to the second alternative vertical shaft connection point 396 that is on a distal end of the second horizontal support structure 360 in the illustrated example. In an example, the eleventh alternative structural string 364 is implemented as a suspension structural string that supports forces primarily in tension and the twelfth alternative structural string 362 is implemented as a post structural string that supports forces in both compression and tension.

The dimensions of the alternative compact electric transmission line support tower configuration 300 that are used to support transmission lines that carry electric power at a transmission voltage of three hundred and forty-five Kilovolts (345 kV) are also similar to those described above for the compact electric transmission line support structure configuration 200.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An electric transmission line support tower, comprising:
   a vertical shaft mounted on a ground surface;
   a crossarm perpendicular to and depending from the vertical shaft on a first side of the vertical shaft, the crossarm comprising:
      a first mounting point; and
      a second mounting point located between the first mounting point and the vertical shaft;
   a central mounting support depending from a point on the crossarm that is between the first mounting point and the second mounting point;
   a first structural string connecting the first mounting point to a first conductor bundle attachment point;
   a second structural string connecting the central mounting support to the first conductor bundle attachment point;
   a third structural string connecting the central mounting support to a second conductor bundle attachment point;
   a fourth structural string connecting the second mounting point to the second conductor bundle attachment point;
   a fifth structural string connecting the central mounting support to a third conductor bundle attachment point, where the fifth structural string is oriented perpendicularly relative to the crossarm and extends between the first conductor bundle attachment point and the second conductor bundle attachment point, where the third conductor bundle attachment point is further from the crossarm than the first conductor bundle attachment point and the second conductor bundle attachment point;
   a sixth structural string connecting the vertical shaft to the third conductor bundle attachment point;
   a second crossarm oriented perpendicular to and depending from the vertical shaft on a second side of the vertical shaft that is opposite the first side, the second crossarm comprising:
      a second crossarm first mounting point; and
      a second crossarm second mounting point located between the second crossarm first mounting point and the vertical shaft;
   a second central mounting support depending from a point on the second crossarm that is between the second crossarm first mounting point and the second crossarm second mounting point;
   a seventh structural string connecting the second crossarm first mounting point to a fourth conductor bundle attachment point;

- an eighth structural string connecting the second central mounting support to the fourth conductor bundle attachment point;
- a ninth structural string connecting the second central mounting support to a fifth conductor bundle attachment point;
- a tenth structural string connecting the second crossarm second mounting point to the fifth conductor bundle attachment point;
- an eleventh structural string connecting the second central mounting support to a sixth conductor bundle attachment point, where the eleventh structural string is oriented perpendicularly relative to the second crossarm and extends between the fourth conductor bundle attachment point and the fifth conductor bundle attachment point, where the sixth conductor bundle attachment point is further from the second crossarm than the fourth conductor bundle attachment point and the fifth conductor bundle attachment point; and
- a twelfth structural string connecting the vertical shaft to the sixth conductor bundle attachment point.

2. The electric transmission line support tower of claim 1, where at least one of the fifth structural string or the sixth structural string support forces in both compression and tension.

3. The electric transmission line support tower of claim 1, where at least one of the first structural string, the second structural string, the third structural string, or the fourth structural string support forces in both compression and tension.

4. The electric transmission line support tower of claim 1, where the first structural string attaches to the first mounting point with a first universal joint, the second structural string attaches to the central mounting support with a second universal joint, the third structural string attaches to the central mounting support with a third universal joint, and the fourth structural string attaches to the second mounting point with a fourth universal joint.

5. The electric transmission line support tower of claim 1, where the crossarm attaches to the vertical shaft at a point removed from a top end of the vertical shaft.

6. The electric transmission line support tower of claim 1, wherein at least one of the vertical shaft and the crossarm comprise a shaft with a polygonal cross section.

7. The electric transmission line support tower of claim 1, wherein at least one of the vertical shaft and the crossarm comprise a shaft with a circular cross section.

8. The electric transmission line support tower of claim 1, wherein at least one of the vertical shaft or the crossarm comprise a lattice structure.

9. The electric transmission line support tower of claim 1, wherein the central mounting support comprises a central mounting point, the central mounting point being located at a distal end of the central mounting support, the distal end of the central mounting support being an end of the central mounting support that is opposite a connection of the central mounting support to the crossarm.

10. The electric transmission line support tower of claim 1, wherein the vertical shaft further comprises a horizontal support depending from a vertical portion of the vertical shaft, the horizontal support extending parallel to and under the crossarm, where the sixth structural string attaches to the vertical shaft at a distal end of the horizontal support that is opposite an attachment of the horizontal support to the vertical portion of the vertical shaft.

* * * * *